March 29, 1966 C. H. W. CLARK 3,243,505

INSULATOR HAVING SEMI-CONDUCTIVE LAYERS TO INCREASE THE CAPACITANCE THEREOF

Filed Feb. 17, 1964

INVENTOR
COLIN HENRY WILLIAM CLARK
BY
Cushman, Darby & Cushman
ATTORNEYS

United States Patent Office 3,243,505

Patented Mar. 29, 1966

3,243,505

INSULATOR HAVING SEMI-CONDUCTIVE LAYERS TO INCREASE THE CAPACITANCE THEREOF

Colin Henry William Clark, Stourport-on-Severn, England, assignor to Steatite and Porcelain Products Limited, London, England, a corporation of Great Britain Filed Feb. 17, 1964, Ser. No. 345,212

Claims priority, application Great Britain, Feb. 25, 1963, 7,505/63

6 Claims. (Cl. 174—140)

Figure 1:
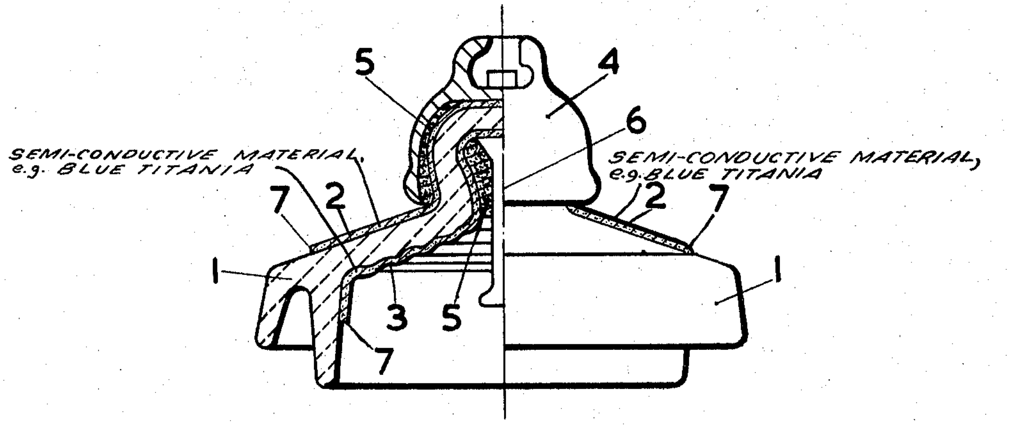

This invention relates to high voltage insulators and especially to insulators for use in polluted or moist atmospheres.

Insulator assemblies are known comprising one or more insulating bodies separating electrically conducting bodies and having semi-conducting layers at or near the surface electrically connected to the conducting bodies, underlying them and extending marginally beyond them to form "fringes." The semi-conducting layers reduce the electrical stress near to the edge of the conducting bodies and thus reduce the incidence of "corona" discharges and radio interference.

In such insulator assemblies the electrically conducting bodies and their associated semi-conducting fringes act as condenser plates. The capacitance of such a condenser is small and that of the assembly not appreciably different from the capacitance of a similar assembly without semi-conducting fringes. When such insulator assemblies are connected in series in the form of a practical high voltage insulator the distribution of the total applied voltage between them is governed by the capacitance of each assembly, the stray capacitance to nearby objects and by moisture and other contamination on the exposed surface of the insulating body. The effects of stray capacitance and of the leakage currents due to surface contamination are unfavourable to satisfactory performance of the insulator.

The present invention provides an insulator assembly comprising one, or a stack of more than one insulating body, each having electrically conducting material attached to opposite sides, each insulating body having, at or near its surface, layers of semi-conducting material underlying, electrically connected to and extending beyond the said electrically conducting material in which the area of the semi-conducting layers is sufficiently large to increase the electrostatic capacitance of the assembly to at least 2.5 times the capacitance of a similar assembly without semi-conducting layers.

Preferably the capacitance is increased by at least five times.

Within the term "electrically conducting material" we wish to include metallic components such as support fittings and wires carrying current and also cement which is used for joining and which is electrically conducting. For example, Portland cement is frequently used and if a measurement is made of the electrical resistivity of a typical mass of set Portland cement it is found that the volume resistivity is of the order of $10^4$ ohm cms. This compares with the volume resistivity of an insulating material such as porcelain which is at least $10^{14}$ ohm cms. For semi-conducting layers such as semi-conducting glazes used on porcelain insulators a different measure of conductivity is used, namely the surface resistivity or resistance between opposite faces of a square of the surface. Normal porcelain has a surface resistivity of the order of $10^{11}$ ohms, due to the adsorbed moisture film; the surface resistivity of a semi-conducting glaze or semi-conducting layer may be in the range of $10^3$ to $10^8$ ohms.

One method of manufacturing high voltage insulator assemblies is to form a number of cup-like insulating bodies known in the trade as shells. A shell may be cemented to metal fittings, for example a metal cap on the outside of the shell and a metal pin within the shell, to form a single-shell insulator assembly. Two or more shells may be cemented together and to metal fittings to form a multi-shell insulator assembly. Such insulator assemblies, whether of the single-shell or the multi-shell construction, may also be joined together, for example by bolts engaging the metal fittings, to form multi-assembly insulators suitable for higher service voltages. The invention is especially applicable to assemblies of such shell-type insulating bodies.

Shell-type insulating bodies are usually of roughly similar proportions because of factors governed for example by production methods and mechanical properties, so although the size and shape may vary, it is usually true to say that a five-fold increase in capacity is obtained when the semi-conducting layers extend over roughly half the surface of the insulating body. The actual values of the capacitance in each case are of course proportional to the areas of the conductors and associated semi-conducting layers and inversely proportional to the thickness of the insulating body.

For a flat insulating body of given thickness and having conducting of diameter 4 inches, for example, the capacitance would be increased by five times by a circular semi-conducting layer of diameter approximately 9 inches. The capacitance of the shell could be increased by reducing the thickness, but the leads to difficulties in manufacture and the thin section is, of course, weaker and less likely to withstand the electrical and mechanical stresses imposed on it in service.

Hitherto an increase in the area of the electrically conducting material to achieve the desired increase in capacitance has been avoided because the length of creepage path over the remaining part of the insulator surface is thereby reduced. Such a reduction of creepage distance, if due to an extension of the fully conducting electrodes such as the metal fittings, would certainly be a serious disadvantage and would increase the tendency for discharges to occur by flashover across the surface, or for currents to leak across the surface.

We have found that this tendency is avoided by using semi-conducting layers having a suitably high surface resistivity. Preferably the surface resistiviity is more than about $2 \times 10^5$ ohms per square. If the surface resistivity is too high however, the semi-conducting layer becomes ineffective and the resistivity should not therefore exceed about $20 \times 10^6$ ohms per square.

In practice satisfactory resistivity can be achieved when the semi-conducting layer comprises blue titania.

In insulator assemblies provided by the present invention the capacitance of each insulating body is sufficient to give a worth-while stabilising current in polluted conditions without seriously reducing the effective creepage distance over the surface of the insulating body.

Insulator assemblies according to the present invention are especially useful when several assemblies are joined together to form a long multi-assembly insulator string or post. In this case every assembly should have a large electrical capacitance in order to obtain the full benefit of the invention. In known insulators having a restricted semi-conducting "fringe" in order to reduce corona discharge the limited effect sought is obtained even if only a few assemblies at the high voltage end of the string or post are so treated.

The semi-conducting layer may be covered with a protective layer of porcelain glaze or it may form part of a glaze. It should of course be in a permanent form able to resist weather and electrical discharges.

It is believed, without prejudice to the invention, that the improved performance of the insulators provided by the invention is due to the large capacitance which controls the voltage gradient across the insulators even when their surfaces are wet and dirty. Whereas in ordinary insulators the voltage gradient is controlled by local variations in surface conditions and stray capacitance which allow local high voltage stresses to be set up, in our insulators the large capacitance renders local effects negligible or of less importance.

Figure 2:
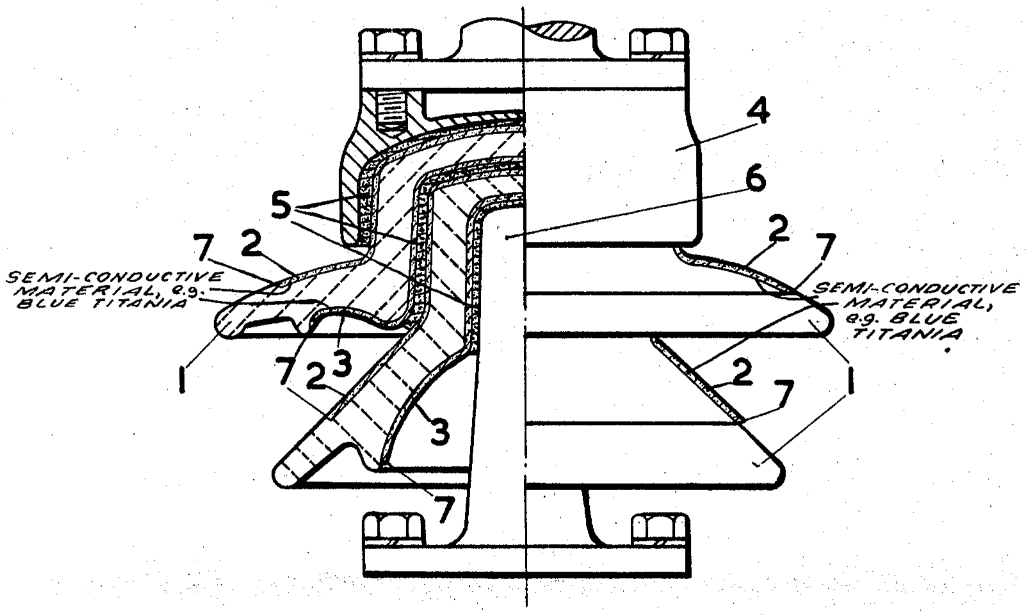

Preferred embodiments of the invention will now be particularly described by way of example only and with reference to the accompanying drawing in which:

FIGURE 1 is a part sectional elevation of an insulator assembly comprising a single insulating body and FIGURE 2 is a similar view of an insulator assembly comprising two insulating bodies cemented together.

Referring to the drawing, a porcelain shell-type insulating body 1 has surface layers 2, 3 comprising semi-conducting blue titania on its top and bottom surfaces, the layers extending radially outwards to positions 7 and together covering about half the total surface of the insulating body. An electrically conducting metallic cap 4 is cemented to a central part of the top layer 2 by electrically conducting cement 5 and makes electrical contact with the layer at the top of the body 1. A metallic pin is similarly cemented to the bottom layer 3. The insulator assembly so formed is suitable for forming a part of a string of similar assemblies having an earthed structure at one end and a conductor carrying a very high voltage at the other. In such strings the pin of one assembly fits into a socket in the cap of the adjacent assembly. Each assembly may have two or more shells cemented together in a stack. The approximate dimensions of the insulator assembly are:

| | | |
|---|---|---|
| Diameter of insulator body **1** | inches | 14 |
| Diameter of semi-conducting layers **2, 3** | do | 10 |
| Internal diameter of cap **4** | do | 4½ |
| Diameter of pin **6** and cement | do | 3 |
| Capacitance | picofarads | 150 |
| Capacitance of similar assembly without semi-conducting layers | do | 30 |

The surface resistivity of the semi-conducting layer was approximately $3\times10^5$ ohms and this was found to give no serious reduction of the flashover voltage of the clean insulator. To demonstrate this, tests were carried out on a string of five cap and pin suspension insulator assemblies (similar to that shown in FIGURE 1). Flashover tests were made using a power frequency voltage with a frequency of 50 cycles per second and also using a 1.2/50 impulse voltage wave (an impulse voltage which rises to full value in 1.2 microseconds and decays to half value in 50 microseconds). In Table I the results are compared with those obtained on a similar string of insulator units with no conducting layers. On longer strings of more than five insulator units the flashover voltages were actually higher for the insulator units of the present invention because the voltage grading on the untreated ones was non-uniform even in clean conditions owing to stray capacitance effects.

*Table I*

| | With semiconducting layer, kv. | Without semi-conducting layer, kv. |
|---|---|---|
| Power frequency flashover voltage—dry | 354 | 360 |
| Power frequency flashover voltage—wet | 233 | 245 |
| Impulse flashover voltage | 565 | 560 |

FIGURE 2 represents a two shell insulator assembly comprising two insulating bodies 1 generally similar to those shown in FIGURE 1, stacked together and joined with conducting cement 5 and having electrically conducting metal fittings 4, 6 cemented to the top and bottom respectively. The flanges of several assemblies can be bolted together end to end to form a post insulator.

Using the insulator assemblies provided by the present invention it is found that serious discharges due to pollution of the insulator surface are less likely to occur when very high voltages are being transmitted.

I claim:

1. In an assembled electrical insulator comprising at least one insulator body, electrically conductive material at and connected to each of opposite sides of each said body, and a layer of semi-conductive material in the surface region of each of said sides and electrically connected to and extending marginally beyond said electrically conductive material, the improvement wherein the area of each said layer of semi-conductive material is such that the electrostatic capacitance of the insulator is at least 2.5 times the capacitance which the insulator would have without said semi-conductive layers.

2. The insulator of claim 1, said capacitance of the insulator being at least 5 times the capacitance which the insulator would have without said semi-conductive layers.

3. The insulator of claim 1, said semi-conductive layers having a surface resistivity of between $2\times10^5$ ohm and $20\times10^6$ ohm.

4. An assembled electrical insulator comprising at least one insulator shell, electrically conductive material at and connected to each of the opposite sides of each said shell and a layer of semi-conductive material in the surface region of each of said sides and electrically connected to and extending marginally beyond said electrically conductive material, the area of each said layer of semi-conductive material being substantially an undivided one-half of the area of the respective said side whereby the electrostatic capacitance of the insulator is substantially 5 times the capacitance which the insulator would have without said semi-conductive layers.

5. The insulator of claim 4 wherein said semi-conductive material has a surface resistivity of between $2\times10^5$ ohm and $20\times10^6$ ohm.

6. The insulator of claim 4 wherein said semi-conductive material is blue titania.

References Cited by the Examiner

UNITED STATES PATENTS 1,290,673 1/1919 Sonneborn ---- 174—140
2,797,175 6/1957 Horton.

FOREIGN PATENTS 21,968 10/1961 Germany.
801,409 5/1936 France.
135,669 12/1919 Great Britain.
586,065 3/1947 Great Britain.
678,718 9/1952 Great Britain.

LARAMIE E. ASKIN, *Primary Examiner.*

ROBERT K. SCHAEFER, *Examiner.*